United States Patent Office 3,507,595
Patented Apr. 21, 1970

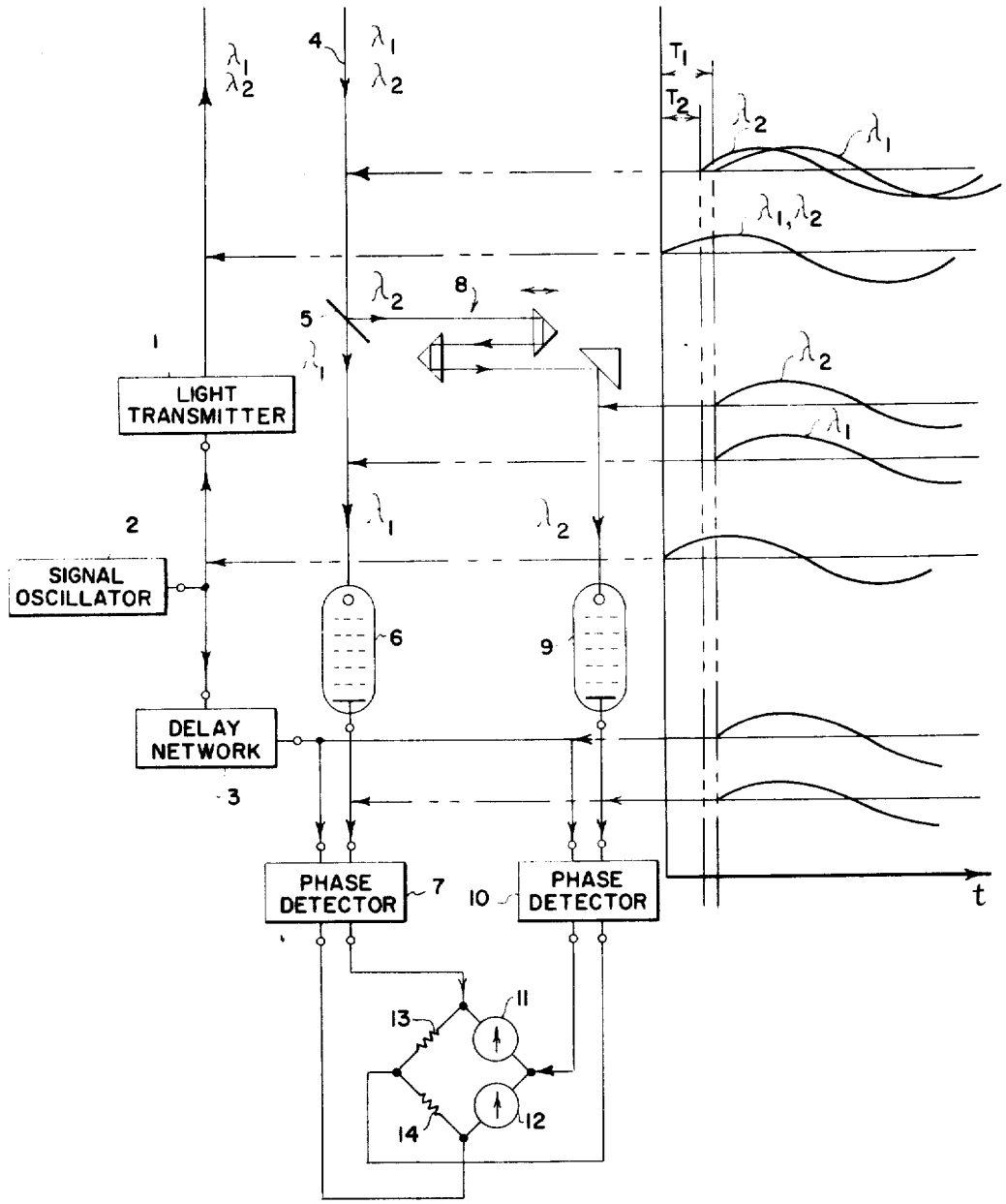

3,507,595
DISTANCE MEASURING DEVICE
Karl Otto Ragnar, Schöldström, Lidingo, Sweden, assignor to AGA Aktiebolag, Lidingo, Sweden, a corporation of Sweden
Filed Oct. 2, 1967, Ser. No. 672,173
Claims priority, application Sweden, Oct. 19, 1966, 14,230/66
Int. Cl. G01c *3/08*
U.S. Cl. 356—5                                  3 Claims

ABSTRACT OF THE DISCLOSURE

A distance measuring system utilizing reflected light includes a light transmitter having an input circuit for receiving a modulating signal and a filter for receiving the light after it has traveled twice the distance to be measured. The filter divides the light into components of two different wavelengths, each of which is applied to individual phototubes and phase detectors. The phase detectors compare the phases of the components with that of a delay network connected to the light transmitter. An auxiliary delay means compensates for delays between the components. The outputs of the detectors are connected to a bridge circuit responsive to both the sum and difference of the detector outputs.

FIELD OF THE INVENTION

The invention relates to the type of distance measuring device transmitting modulated light and receiving it after reflection at a distant object. The term "light" is to be taken in the general sense of electromagnetic radiation, whether visible or not.

BACKGROUND OF THE INVENTION

The accuracy of distance measurement of the type described depends on an exact knowledge of the velocity of the light, which is a function of the temperature as well as of the atmospheric pressure according to the formula $$n = 1 + (n_o - 1)\rho \quad (1)$$

In this equation, $\rho$ is a factor having the value 1 at 0° C. and being proportional to the pressure and inversely proportional to the absolute temperature. Under ordinary conditions, it is not practically possible to obtain values of $\rho$ which are representative of conditions along the entire signal path traversed, and, clearly, these conditions may be entirely different from those at the terminal points.

BRIEF SUMMARY OF THE INVENTION

The present invention relates to a method for deriving an indication of conditions over the entire signal path. This method is based on the fact that the refractive index $n$ depends not only on the factor $\rho$ referred to above but also on the wavelength. If measurements are made at two different wave lengths, one therefore obtains two different values for the distance, from which values it is possible to determine the factor $\rho$.

If it be assumed that two wavelengths are used, which are denoted by subscripts 1 and 2, the following equations hold:

$$n_1 = 1 + (n_{01} - 1)\rho \quad (2)$$

$$n_2 = 1 + (n_{02} - 1)\rho \quad (3)$$

Solving these equations for $\rho$ we obtain:

$$\rho = \frac{n_1 - n_2}{n_{01} - n_{02}} \quad (4)$$

Since the velocity of the light is inversely proportional to the refractive index $n$, the time T required by the light in traversing a certain distance is also proportional to the refractive index. If the time values corresponding to $\lambda_1$ and $\lambda_2$ are $T_1$ and $T_2$, it is therefore possible to determine $n_1 - n_2$, and $\rho$ can then be found from Equation 4.

In accordance with a presently preferred embodiment of the present invention there is provided a light transmitter including an input circuit for receiving a modulating signal and a filter for receiving the light after it has traveled twice the distance to be measured. The filter divides the light into components of two different wavelengths each of which is applied to individual phototubes and phase detectors. The detectors compare the phases of the components with that of a delay network connected to the light transmitter. An auxiliary delay means compensates for delays between the components. The outputs of the detectors are connected to sensing means which preferably comprises a bridge circuit responsive to both the sum and difference of the detector outputs.

BRIEF DESCRIPTION OF THE DRAWING

The single figure of the drawing is a schematic circuit diagram of a presently preferred embodiment of the invention together with waveforms appearing at different points of the circuits.

In accordance with the invention a transmitter 1 is provided for transmitting modulated light in a predetermined direction. The transmitted light comprises at least two wave lengths $\lambda_1$ and $\lambda_2$. Of course, these may not be distinct wavelengths but may comprise adjacent frequency bands (colors) or even bands spaced apart in the frequency scale. The transmitter 1 has an input circuit for receiving the modulating signal which is to modulate the transmitted light.

Connected to the input circuit is the output circuit of a signal oscillator 2, which is also connected to the input of an adjustable delay network 3.

Upon traversing twice the distance to be measured, the reflected light indicated at 4 is collected by a light filter 5, which may be of any known type for separating the light into its two wavelength components $\lambda_1$ and $\lambda_2$.

Component $\lambda_1$ is directed to a first light receiver in the form of a photomultiplier 6 having an output circuit in which there is produced a voltage representing the strength of the incoming light.

The output circuit of photomultiplier 6 is connected to one input circuit of a phase detector 7, the second input circuit of which is connected to the output circuit of the delay network 3. The phase detector 7 compares the phases of the two input voltages applied thereto (from photomultiplier 6 and delay network 3) and produces an output which takes the value 0 when the two inputs are of equal phase.

A second signal path is of similar construction to the first but has, in addition, an auxiliary delay device 8 in the form of an optical signal path of adjustable length included therein for equalizing the delay of component $\lambda_2$ with that of $\lambda_1$. Component $\lambda_2$ is directed from filter 5 via delay device 8 to a second light receiver in the form of a photomultiplier 9, which has an output circuit connected to one input circuit of a second phase detector 10. The phase detector 10 has a second input circuit connected to the output circuit of delay network 3 and compares the phases of the two input voltages thereof similarly as detector 7.

The outputs of phase detectors 7 and 10 are fed to a four-armed bridge network having a pair of null instruments in the form of galvanometers 11 and 12 in two arms and a pair of resistors in the remaining two arms. Detectors 7 and 10 are connected one each in a diagonal of the bridge in such a way as to make one galvanometer respond to the difference and the other to the sum of the detector outputs. This bridge arrangement has the advantage of allowing a higher degree of sensitivity on the differentially responsive galvanometer, since it will be to some extent balanced with regard to simultaneous fluctuations occurring in the two received signal components $\lambda_1$ and $\lambda_2$. Such fluctuations may occur at random owing to atmospheric and other disturbances along the signal path.

OPERATION

The operation of the instrument in accordance with the invention will be apparent from the above description. The two signal components $\lambda_1$ and $\lambda_2$ arriving at filter 5 have slightly different delays $T_1$ and $T_2$, respectively, relative to the transmitted signal, as shown by the graphs.

Component $\lambda_1$ is applied to phototube 6 and phase detector 7 compares the phase of this component with that of the output from delay network 3. Network 3 is adjusted until the phases of the inputs to detector 7 are equal, however, this is not enough to cause phase equality also at the input of detector 10. Such equality is achieved by adjustment of auxiliary delay device 8, which compensates the difference between the delays for $\lambda_1$ and $\lambda_2$. It is clear that galvanometers 11 and 12 cannot both read zero unless the outputs of both phase detectors 7 and 10 are zero.

Various modifications of the instrument shown are possible according to known principles for increasing the sensitivity of this type of distance measuring instrument. For instance, it may be preferable to avoid the translation of a very high signal frequency, such as that obtained from oscillator 2, through the phototubes 6 and 9 in order to diminish the effect of electron transit in the tubes. This may be achieved by a frequency transposition with the aid of an auxiliary oscillator, the output of which heterodynes with the signal before the translation thereof through the phototubes 6 and 9. The heterodyne oscillation may be applied to the cathodes of the multipliers. A similar heterodyning operation must be performed on the signal translated through delay network 3 in well-known manner, so as to provide two input signals of equal frequency to the phase detectors 7 and 10.

It is also known to phase-reverse the signal oscillation so as to make intervals of 0° phase of the transmitted signal alternate with intervals of equal length having 180° phase. Synchronously with this, there is a reversal of the polarity of the phase detector outputs, so that each phase detector responds to one direction to the signal value corresponding to the 0° interval and in the other direction to the signal value corresponding to the 180° interval. In its application to the instrument shown, this principle would call for a periodic phase reversal of the modulation signal at the output of transmitter 1 and a simultaneous reversal of detectors 7 and 10, making these detectors respond in the opposite direction during the reversed-phase intervals. The detectors may then be replaced by integrating null instruments.

The auxiliary delay device 8 need not be inserted before the phototube 9, but could also be inserted between the delay network 3 and the corresponding input circuit of the detector 7.

It will be understood by those skilled in the art that the embodiment of the invention shown and described herein is subject to various other modifications without departing from the scope and spirit of the invention. Accordingly, it should be understood that the invention is not limited by the exemplary embodiment shown and described, but rather only by the subjoined claims as construed in light of the foregoing specification and drawings.

I claim:
1. A distance measuring device comprising:
 a light transmitter for transmitting in a predetermined direction modulated light comprising at least two wavelengths, said transmitter having an input circuit adapted to have a modulating signal applied thereto,
 a signal oscillator having an output circuit connected to said transmitter input circuit,
 a first signal path comprising a first light receiver responsive to one of said wavelengths for receiving light from said direction and having an output circuit,
 a second signal path comprising a second light receiver responsive to another of said wavelengths for receiving light from said direction and having an output circuit,
 an auxiliary delay device in said second signal path,
 an adjustable delay network having an input circuit connected to the output circuit of said signal oscillator and having an output circuit,
 a first phase detector having a pair of input circuits connected to the output circuits of said delay network and of said first signal path for generating a first phase-representative signal,
 a second phase detector having a pair of input circuits connected to the output circuits of said delay network and of said second signal path for generating a second phase-representative signal, and a pair of null instruments responsive, respectively, to the sum and the difference of said phase-representative signals.

2. A distance measuring device as claimed in claim 1, in which said auxiliary delay device is an optical signal path of adjustable length.

3. A distance measuring device as claimed in claim 1, comprising a bridge network having four arms, the first and second arms having null instruments and the third and fourth arms having resistors therein and each diagonal of the network being connected to the output of one of said phase detectors.

References Cited

UNITED STATES PATENTS 2,234,329   3/1941   Wolff _____ 356—5
2,966,090  12/1960   Schöldström _____ 356—5

RICHARD A. FARLEY, Primary Examiner

M. F. HUBLER, Assistant Examiner